United States Patent [19]

El-Hamamsy et al.

[11] Patent Number: 5,059,868

[45] Date of Patent: Oct. 22, 1991

[54] STARTING CIRCUIT FOR AN ELECTRODELESS HIGH INTENSITY DISCHARGE LAMP

[75] Inventors: Sayed-Amr A. El-Hamamsy; Robert J. Thomas, both of Schenectady, N.Y.

[73] Assignee: General Electric Company, Schenectady, N.Y.

[21] Appl. No.: 527,500

[22] Filed: May 23, 1990

[51] Int. Cl.⁵ ............................................. H05B 41/24
[52] U.S. Cl. ..................................... 315/248; 315/344; 313/234
[58] Field of Search ...................... 315/248, 39, 111.51, 315/267, 344, 283; 313/151, 638, 161; 330/207 A

[56] References Cited

U.S. PATENT DOCUMENTS

| | | | |
|---|---|---|---|
| 4,245,178 | 1/1981 | Justice | 315/248 |
| 4,383,203 | 5/1983 | Stanley | 315/248 |
| 4,390,813 | 6/1983 | Stanley | 325/248 |
| 4,748,383 | 5/1988 | Houkes | 315/248 |
| 4,810,938 | 3/1989 | Johnson et al. | 315/248 |
| 4,812,702 | 3/1989 | Anderson | 313/153 |
| 4,894,589 | 2/1990 | Borowiec | 315/248 |
| 4,894,590 | 2/1990 | Witting | 315/248 |
| 4,902,937 | 2/1990 | Witting | 315/248 |
| 4,959,592 | 9/1990 | Anderson | 315/248 |

Primary Examiner—Eugene R. LaRoche
Assistant Examiner—Amir Zarabian
Attorney, Agent, or Firm—Jill M. Breedlove; James C. Davis, Jr.; Marvin Snyder

[57] ABSTRACT

A starting circuit for an electrodeless high intensity discharge lamp comprises a high efficiency power supply for providing a radio frequency signal to a starting probe disposed proximate the arc tube of the lamp. The power supply may comprise either a Class-D or Class-E power amplifier having an output resonant circuit tuned to a substantially higher frequency than the operating frequency of the signal provided to the excitation coil by the lamp ballast to ensure minimal interaction between the starting circuit and the ballast. The output resonant circuit includes an inductance coupled in series with a capacitance that preferably comprises the capacitance between the excitation coil and the starting probe. After initiating the arc discharge, the starting circuit is deactivated.

17 Claims, 3 Drawing Sheets

STARTING CIRCUIT FOR AN ELECTRODELESS HIGH INTENSITY DISCHARGE LAMP

RELATED PATENT APPLICATIONS

This patent application is related to U.S. patent application of S. A. El-Hamamsy and V. D. Roberts, entitled "A Starting Aid for an Electrodeless High Intensity Discharge Lamp", Ser. No. 527,503, and to U.S. patent application of V. D. Roberts, S. A. El-Hamamsy and R. J. Thomas, entitled "A Starting Aid for an Electrodeless High Intensity Discharge Lamp", Ser. No. 527,502. The aforementioned patent applications, which are incorporated herein by reference, are each assigned to the instant assignee and filed concurrently herewith.

FIELD OF THE INVENTION

The present invention relates generally to high intensity discharge (HID) lamps. More particularly, the present invention relates to a circuit for initiating the arc discharge in an electrodeless HID lamp.

BACKGROUND OF THE INVENTION

In a high intensity discharge (HID) lamp, a medium to high pressure ionizable gas, such as mercury or sodium vapor, emits visible radiation upon excitation typically caused by passage of current through the gas. One class of HID lamps comprises electrodeless lamps which generate an arc discharge by generating a solenoidal electric field in a high-pressure gaseous lamp fill. In particular, the lamp fill, or discharge plasma, is excited by radio frequency (RF) current in an excitation coil surrounding an arc tube. The arc tube and excitation coil assembly acts essentially as a transformer which couples RF energy to the plasma. That is, the excitation coil acts as a primary coil, and the plasma functions as a single-turn secondary. RF current in the excitation coil produces a time-varying magnetic field, in turn creating an electric field in the plasma which closes completely upon itself, i.e., a solenoidal electric field. Current flows as a result of this electric field, resulting in a toroidal arc discharge in the arc tube.

At room temperature, the solenoidal electric field produced by the excitation coil is typically not high enough to ionize the gaseous fill and thus initiate the arc discharge. One way to overcome this shortcoming is to lower the gas pressure of the fill, for example, by first immersing the arc tube in liquid nitrogen so that the gas temperature is decreased to a very low value and then allowing the gas temperature to increase. As the temperature rises, an optimum gas density is eventually reached for ionization, or breakdown, of the fill to occur so that an arc discharge is initiated. However, the liquid nitrogen method of initiating an arc discharge is not practical for widespread commercial use.

More recent methods for starting electrodeless HID lamps entail using starting aids to capacitively couple the high voltage developed across the excitation coil turns into the arc tube. As a result of this voltage gradient, a capacitive current flows between the starting aid and the excitation coil, and hence through the arc tube, thereby ionizing the gaseous fill and producing a low current glow discharge therein. When the gas is sufficiently ionized, a transition is made from a relatively low current glow discharge to a relatively high current, high intensity solenoidal arc discharge. Such a starting aid may comprise, for example, a pair of capacitive starting electrodes, as described in U.S. Pat. No. 4,902,937 of H. L. Witting, issued Feb. 20, 1990, and assigned to the instant assignee, which patent is hereby incorporated by reference. Each starting electrode comprises a conductive ring which surrounds the arc tube and is connected to the excitation coil. Coupling a high voltage signal between the pair of starting electrodes causes an electric field to be produced therebetween which is of sufficient magnitude to create a glow discharge in the arc tube due to the arc tube wall capacitance. Furthermore, as it has been determined that the application of relatively large fields directly to the arc tube via the starting aid may cause early arc tube degradation, heat sensitive members, e.g. bimetallic strips, are utilized for moving the starting electrodes away from the arc tube after initiating an arc discharge, thereby preserving the useful life of the lamp.

A spiral starting electrode for an electrodeless HID lamp is described in U.S. Pat. No. 4,894,590 of H. L. Witting, issued Jan. 16, 1990, and assigned to the instant assignee, which patent is hereby incorporated by reference. A single, conical-spiral-shaped starting electrode is positioned so that its narrower end is adjacent to, or on, the arc tube surface. The wider end of the starting electrode is positioned so that flux generated by the excitation coil cuts the turns of the spiral electrode, thereby generating a high-voltage signal which results in a sufficiently high electric field gradient to create a glow discharge in the arc tube. A bimetallic strip is utilized to move the starting electrode away from the arc tube after an arc discharge is initiated therein.

A pair of starting electrodes which are moved from a rest position to a starting location adjacent to the arc tube by piezoelectric means are described in U.S. Pat. No. 4,894,589 of J. C. Borowiec, issued Jan. 16, 1990, and assigned to the instant assignee, which patent is hereby incorporated by reference. The piezoelectric means is deactivated after an arc discharge is initiated, and the starting electrodes are moved back to the rest position. The piezoelectric means allows selective movement of the starting electrodes, thereby enabling the lamp to be restarted, if necessary, even if the arc tube is still hot.

In commonly assigned, copending U.S. Pat. No. 4,982,140 of H. L. Witting, issued Jan. 1, 1991 another starting aid for an electrodeless HID lamp is described which comprises a first conductive coil disposed about a second conductive coil, each coil having a truncated-cone shape. The coils are wound in opposite directions so that voltages induced therein add together to provide a sufficiently high electric field gradient to initiate an arc discharge in the arc tube. A bimetallic support is used to move the starting aid between a starting position adjacent to the arc tube and a lamp-operating position at a predetermined location away from the arc tube. The Witting patent is hereby incorporated by reference.

Although the hereinabove described starting aids are effective for initiating an arc discharge in electrodeless HID lamps, it is desirable for some applications to provide a starting aid which does not require movement of the starting aid. In particular, for an HID lamp having an outer envelope surrounding the arc tube, moving the starting aid may be difficult to accomplish with a high degree of reliability, thus rendering such starting aids impractical for many applications.

Furthermore, it is desirable to provide a starting aid that applies the ionizing electric field to the fill substantially simultaneously with the excitation coil current reaching its maximum amplitude. Otherwise, if the starting aid initiates the glow discharge before the excitation coil current reaches its maximum amplitude, the system may be damped, thus reducing the maximum coil current and possibly preventing a transition to a solenoidal discharge.

OBJECTS OF THE INVENTION

Accordingly, it is an object of the present invention to provide a starting circuit for an electrodeless HID lamp which does not require movement of a starting aid between a starting position close to the arc tube and a lamp-operating position farther away from the arc tube.

Another object of the present invention is to provide a starting circuit for an electrodeless HID lamp system employing a tuned starting circuit which is independent from, and does not interfere with operation of, the ballast circuit, thereby enabling application of a starting current at an optimal starting time.

Still another object of the present invention is to provide a starting system for an electrodeless HID lamp wherein a capacitively coupled, relatively high starting current is extinguished after the lamp is started, thereby preserving the useful life of the lamp.

SUMMARY OF THE INVENTION

The foregoing and other objects are achieved in a starting circuit for an electrodeless HID lamp comprising a fixed starting probe and a high efficiency power supply, which includes a tuned output circuit, for providing a radio frequency signal to the starting probe in order to generate a capacitively coupled starting current for initiating an arc discharge in the arc tube of the lamp. The high efficiency power supply preferably comprises either a Class-D or Class-E power amplifier. The tuned output circuit comprises an inductance and a capacitance coupled in series. Preferably, the capacitance of the tuned circuit comprises the parasitic capacitance between the starting probe and the excitation coil. In accordance with a preferred embodiment of the present invention, the starting circuit operates at a higher frequency than that used to operate the lamp ballast to drive the excitation coil. In this way, the starting circuit is independent from the lamp ballast circuit and, therefore, does not interfere with the operation thereof, for example by detuning the output resonant circuit of a Class-D type ballast. Moreover, such an independent starting circuit can be used to ensure that the starting current is generated substantially simultaneously with the excitation coil current reaching its maximum amplitude. Once an arc discharge is initiated, the starting circuit is deactivated, thus effectively comprising a high impedance with respect to the lamp ballast circuit. As a result, the capacitively coupled starting current is extinguished, thereby preserving the useful life of the lamp.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
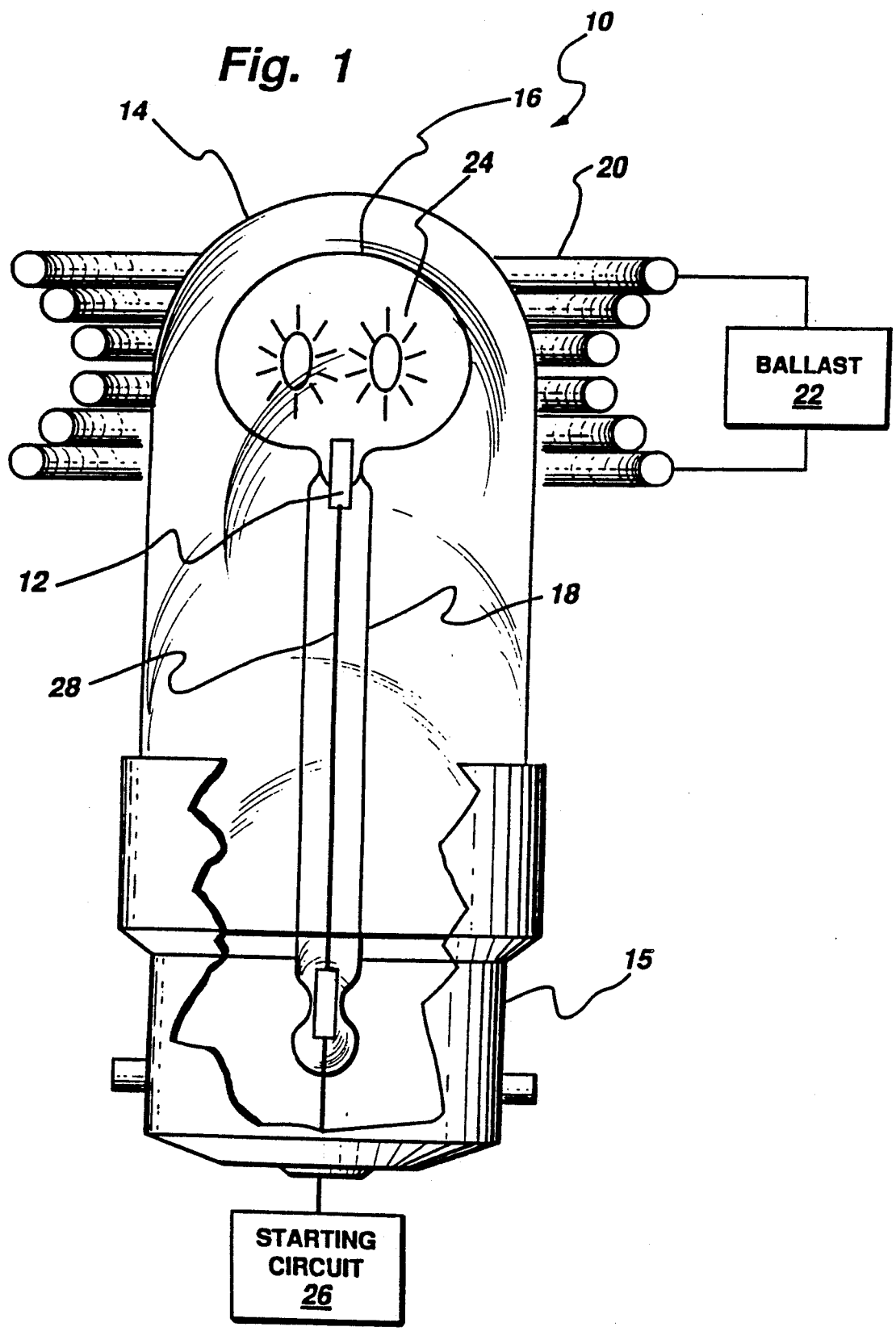
FIG. 1 is a partially schematic view of an HID lamp system employing a starting circuit in accordance with a preferred embodiment of the present invention, including a partially cutaway side view of an electrodeless HID lamp.

FIG. 1 illustrates an HID lamp system, including an electrodeless HID lamp 10 employing a fixed starting probe 12, in accordance with a preferred embodiment of the present invention. Lamp 10 includes an outer envelope 14 mounted in a base 15 and encloses an arc tube 16 supported therein by a rod 18. Envelope 14 and arc tube 16 each comprise a light-transmissive material, such as fused quartz or polycrystalline alumina. Arc tube 16 contains a fill in which a solenoidal arc discharge is excited during lamp operation. A suitable fill, described in U.S. Pat. No. 4,810,938 of P. D. Johnson, J. T. Dakin and J. M. Anderson, issued on Mar. 7, 1989 and assigned to the present assignee, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is hereby incorporated by reference. Another suitable fill is described in copending U.S. patent application of H. L. Witting, issued Nov. 20, 1990, and assigned to the instant assignee, which patent is hereby incorporated by reference. The fill of the latter Witting patent comprises a combination of a lanthanum halide, a sodium halide, a cerium halide and xenon or krypton as a buffer gas; for example, a fill according to the Witting patent may comprise a combination of lanthanum iodide, sodium iodide, cerium iodide, and 250 torr partial pressure of xenon.

An excitation coil 20 is coupled to a radio frequency ballast 22 and surrounds arc tube 16 for exciting an arc discharge in the fill. By way of example, coil 20 is illustrated as having turns which are arranged to have a substantially V-shaped cross section on each side of a coil center line 23. Such a coil configuration is described in commonly assigned U.S. Pat. No. 4,812,702 of J. M. Anderson, issued Mar. 14, 1989, which patent is hereby incorporated by reference.

In operation, RF current in coil 20 results in a time-varying magnetic field which produces within arc tube 16 an electric field which completely closes upon itself. Current flows through the fill within arc tube 16 as a result of this solenoidal electric field, producing a toroidal arc discharge 24 therein. Suitable operating frequencies for RF ballast 22 are in the range from 0.1 to 30 megahertz (MHz), exemplary operating frequencies being 13.56 and 6.78 MHz. These frequencies are within the industrial, scientific, and medical (ISM) band of the electromagnetic spectrum in which moderate amounts of electromagnetic radiation are permissible; and such radiation generally is emitted by an electrodeless HID lamp system.

In FIG. 1, starting probe 12 is illustrated as being mounted in arc tube support rod 18 in close proximity to arc tube 16. A preferred embodiment of starting probe comprises a foil, for example comprised of copper. However, other suitable, starting probes may be used with the starting circuit of the present invention, such as, for example, a loop of wire (not shown). Starting probe 12 is coupled to a starting circuit 26 by a lead 28. Starting circuit 26 is independent from ballast 22, as shown, and preferably operates at a substantially higher frequency than ballast 22, a suitable operating frequency for starting circuit 26 being in the range from approximately 1 to 40 MHz, depending, of course, on the ballast operating frequency.

Although starting probe 12 is described herein as being fixed, it is to be understood that starting circuit 26 of the present invention may be used with movable starting aids, such as those described in: Witting U.S. Pat. No. 4,902,937; Witting U.S. Pat. No. 4,894,590; Borowiec U.S. Pat. No. 4,894,589; Witting U.S. patent application, Ser. No. 417,404; El-Hamamsy and Roberts U.S. patent application, Ser. No. 527,503; and Roberts, El-Hamamsy and Thomas U.S. patent application, Ser. No. 527,502; all of which are cited hereinabove.

Figure 2:
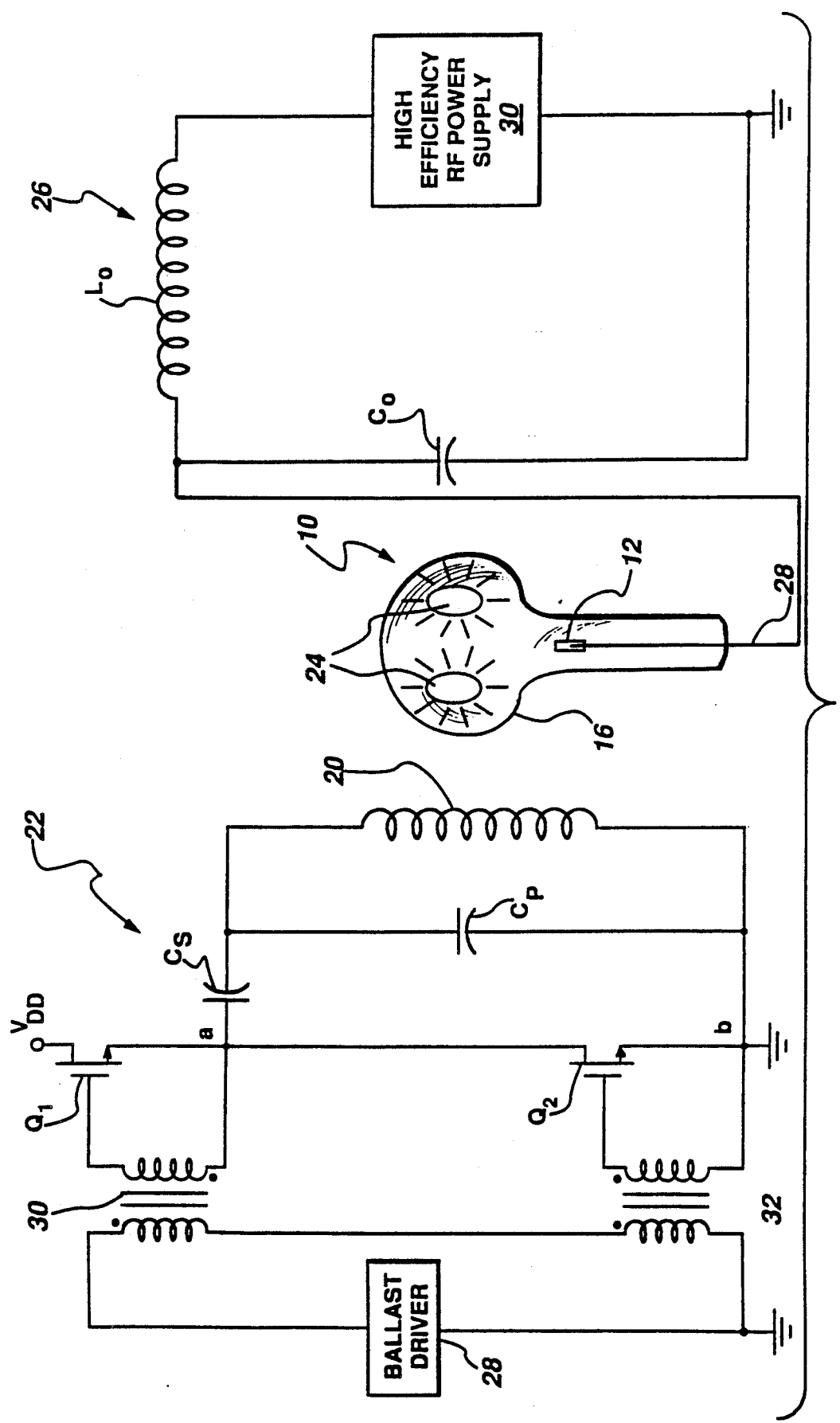
FIG. 2 is a more detailed schematic illustration of the HID lamp system of FIG. 1.

FIG. 2 schematically illustrates an HID lamp system employing a starting circuit in accordance with a preferred embodiment of the present invention. By way of example, ballast 22 is illustrated as comprising a Class-D power amplifier, such as the ballast described in commonly assigned, copending U.S. patent application of S. A. El-Hamamsy and J. C. Borowiec, Ser. No. 472,144, filed Jan. 30, 1990, which is hereby incorporated by reference. The Class-D ballast includes two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 28 via input isolation transformers 30 and 32, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 28 may comprise means for generating two out-of-phase sinusoidal signals, as described in U.S. patent application of S. A. El-Hamamsy and G. Jernakoff, Ser. No. 454,614, filed Dec. 21, 1989, which patent application is hereby incorporated by reference.

A resonant load network is connected to the half-bridge at the junction between switching devices $Q_1$ and $Q_2$ and in parallel with switching device $Q_2$. The resonant load network comprises the excitation coil 20 of HID lamp 10 and a tuning capacitor $C_p$ connected in parallel therewith. (For clarity of illustration, coil 20 is not shown in its operational position about arc tube 16.) The parallel combination of capacitor $C_p$ and coil 20 functions as an impedance transformer to reflect the impedance of the arc discharge 24 into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning. As described in the El-Hamamsy and Borowiec patent application, cited hereinabove, capacitors $C_s$ and $C_p$ are chosen to ensure impedance matching for maximum efficiency.

In accordance with the present invention, starting circuit 26 comprises a resonant circuit, including an inductance $L_o$ coupled in series with a capacitance $C_o$. The resonant circuit is tuned to the frequency of high efficiency RF power supply 30 which provides RF power to initiate the arc discharge 24 in arc tube 16.

Capacitance $C_o$ preferably comprises the parasitic capacitance between starting probe 12 and excitation coil 20. To ensure minimal coupling between ballast 22 and starting circuit 26, high efficiency RF power supply 30 is driven at a higher frequency than ballast 22. That is, an operating frequency for starting circuit 26 should be chosen to ensure that the tuned circuit comprising inductance $L_o$ and capacitance $C_o$ will not be excited by excitation coil 20 when the starting circuit is deactivated after the arc discharge has been initiated. Moreover, the capacitively coupled starting current is extinguished without requiring movement of the starting probe. With ballast 22 driven at 13.56 MHz, for example, a preferred operating frequency for starting circuit 26 is in the range from 15 to 40 MHz, with 27.12 MHz being a preferred frequency. At 27.12 MHz, exemplary values for capacitance $C_o$ and inductance $L_o$ and are 1-2 picofarads and 17-34 microhenries, respectively.

Another advantage of driving starting circuit 26 at a substantially higher frequency than ballast 22 is that once ionization of the fill is initiated, a lower voltage is required to drive the same current through the discharge. In particular, once ionization occurs, current increases as the discharge impedance becomes more capacitive. Furthermore, the higher the ionization current, the easier the transition to the full solenoidal discharge. As a result, since frequency is inversely proportional to capacitive impedance, transition from a glow discharge to a high intensity solenoidal discharge is made easier, even at a relatively low starting circuit voltage, using a relatively high frequency starting system.

Still another advantage of employing independent starting circuit 26 is that it may be activated at an optimal time to generate a starting current substantially simultaneously with the excitation coil current reaching its maximum amplitude, thus ensuring against establishing a damped system which could prevent a successful transition from a glow discharge to a high intensity solenoidal discharge.

Figure 3:
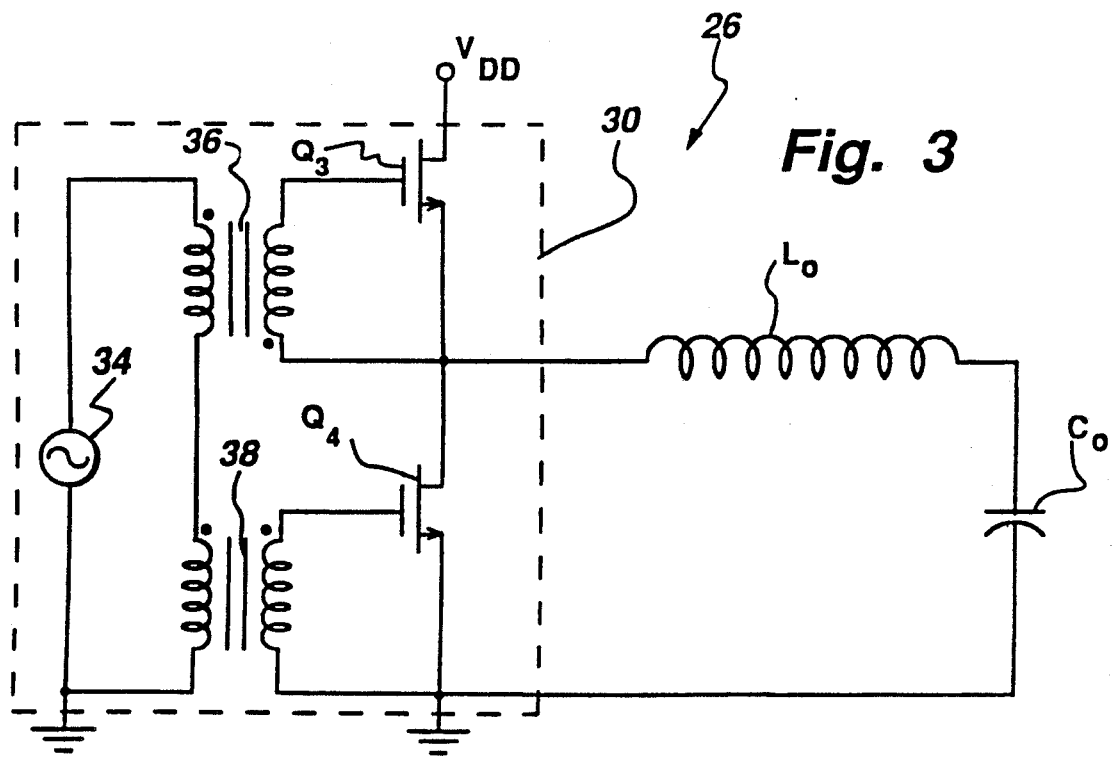
FIG. 3 is a schematic illustration of a preferred embodiment of the starting circuit of FIG. 2.

FIG. 3 is a schematic illustration of a preferred embodiment of starting circuit 26 including high frequency RF power supply 30. As shown, RF power supply 30 comprises a Class-D power amplifier which includes two switching devices $Q_3$ and $Q_4$ connected in series with dc power supply $V_{DD}$ in a half-bridge configuration. Switching devices $Q_3$ and $Q_4$ are illustrated as MOSFET's, but other types of switching devices having capacitive gates may be used, such IGBT's or MCT's. Switching devices $Q_3$ and $Q_4$ are coupled to a high frequency oscillator 34 via input isolation transformers 36 and 38, respectively. Operation of Class-D power amplifier 26 is similar to that of Class-D ballast 22, described hereinabove, except the frequency of Class-D circuit 26 is preferably substantially higher.

Figure 4:
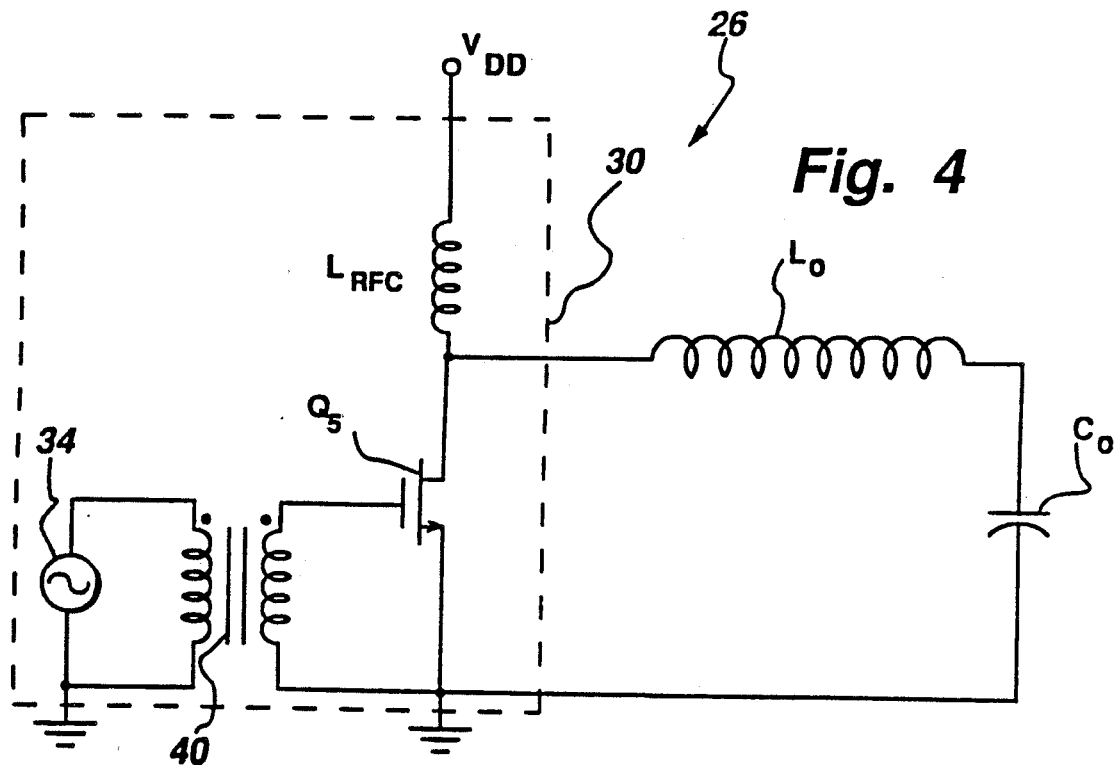
FIG. 4 is a schematic illustration of an alternative embodiment of the starting circuit of FIG. 2.

FIG. 4 schematically illustrates an alternative embodiment of starting circuit 26 comprising a high efficiency Class-E power amplifier which includes a single switching device $Q_5$ connected in series with dc power supply $V_{DD}$ and an RF choke $L_{RFC}$ for ensuring that the input current from the DC power supply $V_{DD}$ remains substantially constant. Switching device $Q_5$ is illustrated as a MOSFET, but another type of switching device having a capacitive gate may be used, such as an IGBT or MCT. Switching device $Q_5$ is coupled to high frequency oscillator 34 via an isolation transformer 40 for providing a starting circuit operating frequency that is preferably substantially higher than that of ballast 22, as explained hereinabove.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A starting circuit for an electrodeless high intensity discharge lamp of the type having an excitation coil situated about an arc tube containing a fill for exciting an arc discharge in said arc tube upon application of a first radio frequency signal to said excitation coil, said starting circuit comprising:
   a starting probe disposed proximate said arc tube at least during initiation of the arc discharge therein; and
   a high efficiency, radio frequency power supply coupled to said starting probe for providing a second radio frequency signal thereto, said power supply comprising a Class-D power amplifier having first and second switching devices coupled in series in a half-bridge configuration, said power supply further including a tuned output circuit coupled to the junction between said switching devices, said tuned output circuit comprising an inductance coupled in series with a capacitance.

2. A starting circuit for an electrodeless high intensity discharge lamp of the type having an excitation coil situated about an arc tube containing a fill for exciting an arc discharge in said arc tube upon application of a first radio frequency signal to said excitation coil, said starting circuit comprising:
   a starting probe disposed proximate said arc tube at least during initiation of the arc discharge therein; and
   a high efficiency, radio frequency power supply coupled to said starting probe for providing a second radio frequency signal thereto, said power supply comprising a Class-E power amplifier including a switching device coupled in series with a radio frequency choke means, said power supply further including a tuned output circuit coupled to the junction between said switching device and said radio frequency choke means, said tuned output circuit comprising an inductance coupled in series with a capacitance.

3. The starting circuit of claims 1 or 2 wherein said capacitance comprises the parasitic capacitance between the said excitation coil and said starting probe.

4. The starting circuit of claims 1 or 2 wherein said starting probe comprises a foil.

5. The starting circuit of claim 4 wherein said foil is comprised of copper.

6. The starting circuit of claims 1 or 2 wherein the frequency of said second radio frequency signal is higher than the frequency of said first radio frequency signal.

7. The starting circuit of claim 6 wherein the frequency of said first radio frequency signal is in the range from approximately 0.1 to 30 MHz, and the frequency of said second radio frequency signal is in the range from approximately 1 to 40 MHz.

8. The starting circuit of claim 7 wherein the frequency of said second radio frequency signal is approximately 27.12 MHz, and the frequency of said first radio frequency signal is approximately 13.56 MHz.

9. An electrodeless high intensity discharge lamp system, comprising:
   an electrodeless high intensity discharge lamp comprising an excitation coil situated about an arc lamp which contains a fill;
   a ballast for providing a first radio frequency signal to said excitation coil for exciting an arc discharge in said arc tube;
   a starting probe disposed proximate said arc tube at least during initiation of the arc discharge therein; and
   a starting circuit coupled to said starting probe for providing a second radio frequency signal thereto, said starting circuit comprising a Class-D power amplifier having first and second switching devices coupled in series in a half-bridge configuration, said starting circuit further including a tuned output circuit coupled to the junction between said switching devices, said tuned output circuit comprising a capacitance coupled in series with an inductance.

10. An electrodeless high intensity discharge lamp system, comprising:
    an electrodeless high intensity discharge lamp comprising an excitation coil situated about an arc tube which contains a fill;
    a ballast for providing a first radio frequency signal to said excitation coil for exciting an arc discharge in said arc tube;
    a starting probe disposed proximate said arc tube at least during initiation of the arc discharge therein; and
    a starting circuit coupled to said starting probe for providing a second radio frequency signal thereto, said starting circuit comprising a Class-E power amplifier including a switching device coupled in series with a radio frequency choke means, said starting circuit further comprising an output tuned circuit coupled to the junction between said switching device and said radio frequency choke means.

11. The high intensity discharge lamp system of claims 9, 10 or 11 wherein said capacitance comprises the parasitic capacitance between the said excitation coil and said starting probe.

12. The high intensity discharge lamp system of claims 9 or 10 wherein said starting probe comprises a foil.

13. The high intensity discharge lamp system of claim 12 wherein said foil is comprised of copper.

14. An electrodeless high intensity discharge lamp system, comprising:
    an electrodeless high intensity discharge lamp comprising an excitation coil situated about an arc tube which contains a fill;
    a ballast for providing a first radio frequency signal to said excitation coil for exciting an arc discharge in said arc tube, said ballast comprising a Class-D power amplifier including two switching devices coupled in series in a half-bridge configuration and having an output resonant circuit coupled at the junction between said two switching devices, said output resonant circuit comprising the inductance of said excitation coil coupled in series with a ballast output capacitance;

a starting probe disposed proximate said arc tube at least during initiation of the arc discharge therein; and a starting circuit coupled to said starting probe for providing a second radio frequency signal thereto, said starting circuit including a tuned output circuit comprising a capacitance coupled in series with an inductance.

15. The high intensity discharge lamp system of claims 9 or 10 wherein the frequency of said second radio frequency signal is higher than the frequency of said first radio frequency signal.

16. The high intensity discharge lamp system of claim 15 wherein the frequency of said first radio frequency signal is in the range from approximately 0.1 to 30 MHz, and the frequency of said second radio frequency signal is in the range from approximately 1 to 40 MHz.

17. The high intensity discharge lamp system of claim 16 wherein the frequency of said second radio frequency signal is approximately 27.12 MHz, and the frequency of said first radio frequency signal is approximately 13.56 MHz.

* * * * *